(12) United States Patent
Stenger et al.

(10) Patent No.: US 12,533,936 B2
(45) Date of Patent: Jan. 27, 2026

(54) RESILIENT COUPLING ELEMENT FOR A MOTOR VEHICLE HAVING AT LEAST ONE COUPLING ELEMENT

(71) Applicant: Bayerische Motoren Werke Aktiengesellschaft, Munich (DE)

(72) Inventors: Josef Stenger, Raubling (DE); Lukas Stumbaum, Landsberied (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 346 days.

(21) Appl. No.: 18/022,316

(22) PCT Filed: Oct. 28, 2021

(86) PCT No.: PCT/EP2021/080045
§ 371 (c)(1),
(2) Date: Feb. 21, 2023

(87) PCT Pub. No.: WO2022/096371
PCT Pub. Date: May 12, 2022

(65) Prior Publication Data
US 2023/0322066 A1    Oct. 12, 2023

(30) Foreign Application Priority Data
Nov. 3, 2020    (DE) .................... 10 2020 128 841.7

(51) Int. Cl.
*B60K 1/04*    (2019.01)
*F16F 1/26*    (2006.01)
(Continued)

(52) U.S. Cl.
CPC .................. *B60K 1/04* (2013.01); *F16F 1/26* (2013.01); *F16F 7/12* (2013.01); *F16F 15/073* (2013.01);
(Continued)

(58) Field of Classification Search
CPC ............... B60K 1/04; B60K 2001/0438; F16F 2234/02; F16F 2238/022
See application file for complete search history.

(56) References Cited

U.S. PATENT DOCUMENTS 3,679,159 A * 7/1972 Bach .................... F16F 9/0472
267/153
6,899,975 B2 * 5/2005 Watanabe ........... H01M 50/242
429/162
(Continued)

FOREIGN PATENT DOCUMENTS

CN    109417140 A    3/2019
CN    109768191 A    5/2019
(Continued)

OTHER PUBLICATIONS

International Search Report (PCT/ISA/210) issued in PCT Application No. PCT/EP2021/080045 dated Jan. 5, 2022 with English translation (five (5) pages).
(Continued)

*Primary Examiner* — Katy M Ebner
(74) *Attorney, Agent, or Firm* — Crowell & Moring LLP

(57) ABSTRACT

A resilient coupling element for a motor vehicle, which is to be placed between an energy store housing structure and a passenger compartment floor structure, is made of a spring sheet or plate. A motor vehicle having an energy store housing structure and a passenger compartment floor structure, includes the coupling element of the aforementioned kind being effective between the energy store housing structure and the passenger compartment floor structure.

6 Claims, 2 Drawing Sheets

(51) Int. Cl.
*F16F 7/12* (2006.01)
*F16F 15/073* (2006.01)

(52) U.S. Cl.
CPC . *B60K 2001/0438* (2013.01); *F16F 2228/066* (2013.01); *F16F 2230/0005* (2013.01); *F16F 2232/08* (2013.01); *F16F 2238/022* (2013.01)

(56) References Cited

U.S. PATENT DOCUMENTS

| | | | | |
|---|---|---|---|---|
| 9,033,078 | B2* | 5/2015 | Fillion | H01M 50/249 180/68.5 |
| 9,718,340 | B2* | 8/2017 | Berger | B60K 1/00 |
| 11,005,122 | B2* | 5/2021 | Jung | H01M 50/216 |
| 2003/0162091 | A1* | 8/2003 | Watanabe | H01M 50/124 429/156 |
| 2008/0136110 | A1* | 6/2008 | He | B60K 1/04 277/316 |
| 2012/0160583 | A1* | 6/2012 | Rawlinson | H01M 50/242 903/952 |
| 2019/0144048 | A1* | 5/2019 | Frenzel | B62D 25/20 296/1.03 |
| 2020/0282817 | A1 | 9/2020 | Becker et al. | |
| 2022/0042566 | A1* | 2/2022 | Burr | A42B 3/12 |
| 2022/0118839 | A1* | 4/2022 | Amaanan | B60K 1/04 |
| 2024/0213604 | A1* | 6/2024 | Yoshizawa | H01M 10/0481 |

FOREIGN PATENT DOCUMENTS

| | | | | |
|---|---|---|---|---|
| CN | 110978979 A | | 4/2020 | |
| CN | 116379098 A | * | 7/2023 | ............ F16F 13/002 |
| DE | 10 2016 206 177 A1 | | 10/2017 | |
| DE | 10 2016 213 262 A | | 1/2018 | |
| DE | 102022124584 A1 | * | 3/2024 | ............ B62D 25/20 |
| EP | 3428993 A1 | * | 1/2019 | .......... H01M 50/231 |
| FR | 2 964 623 A3 | | 3/2012 | |
| WO | WO 2019/121077 A1 | | 6/2019 | |
| WO | WO 2020/136021 A1 | | 7/2020 | |

OTHER PUBLICATIONS

German-language Written Opinion (PCT/ISA/237) issued in PCT Application No. PCT/EP2021/080045 dated Jan. 5, 2022 (six (6) pages).

German-language Search Report issued in German Application No. 10 2020 128 841.7 dated Oct. 14, 2021 with partial English translation (11 pages).

English translation of Chinese-language Office Action issued in Chinese Application No. 202180050379.5 dated Aug. 29, 2025 (6 pages).

\* cited by examiner

RESILIENT COUPLING ELEMENT FOR A MOTOR VEHICLE HAVING AT LEAST ONE COUPLING ELEMENT

BACKGROUND AND SUMMARY

The invention relates to a resilient coupling element for a motor vehicle for arrangement between an energy store housing structure and a passenger compartment floor structure. The invention moreover relates to a motor vehicle with an energy store housing structure and a passenger compartment floor structure.

The document WO 2019/121077 A1 relates to a motor vehicle with a body. The body comprises a passenger compartment, wherein the passenger compartment has a floor structure. A housing structure for energy stores is fastened to an underside of the floor structure, wherein the housing structure is a closed container which has a trough-shaped component and a cover spaced apart from the trough-shaped component. At least one damping component is arranged in an intermediate space between the underside of the floor and an outer surface of the cover of the housing structure and is installed under pretension in the intermediate space between the cover of the housing structure and the floor, wherein the damping component is a compressible foam. In order to reduce vibrations of the floor assembly, it is proposed in document WO 2019/121077 A1 to use an elastomeric foam as the compressible foam of the damping component, the material properties of which when dynamically loaded include dynamic hardening such that the stiffness under dynamic load beyond a frequency of greater than 0.1 Hz is greater by a dynamic hardening factor, which is greater than 2, than the stiffness which exists under quasi-static load, as is the case, for example, during assembly.

The invention is based on the object of structurally and/or functionally improving a coupling element mentioned at the beginning. The invention is moreover based on the object of structurally and/or functionally improving a motor vehicle mentioned at the beginning.

The object is achieved by a coupling element and by a motor vehicle in accordance with the independent claims. Advantageous embodiments and/or developments are the subject of the dependent claims.

The coupling element can be active geometrically, mechanically, acoustically, and/or using vibration technology. The coupling element can serve to reduce acoustically active vibrations in a passenger compartment. The coupling element can serve to assist predetermined vibration behavior of the energy store housing structure and/or the passenger compartment floor structure. The coupling element can serve to change, in particular to shorten, the wavelength in the case of vibration of the passenger compartment floor structure. The coupling element can ensure that predetermined very high mechanical stresses in the energy store housing structure and/or in the passenger compartment floor structure are not exceeded, even when tolerances are taken into account, during an assembly process. In the present case, "structure" refers in particular to components and/or modules which have a structural composition. These components and/or modules can be structurally and/or functionally active.

The spring sheet (plate) can be produced from a metal or a metal alloy, in particular from steel, such as stainless steel, or a copper alloy. The spring sheet can be produced from a metal or a metal alloy with increased strength compared with other metals or metal alloys. The spring sheet can be produced, for example, from one of the following materials: X10CrNi18-8, 38Si7, 61SiCr7, 52CrMoV4, 51CrV4, C67E/C67S. The spring sheet can be produced as a flat product, an elongated product, and/or a rolled product. The coupling element can be produced from a ribbon-shaped, strip-shaped, and/or tube-shaped spring sheet. The coupling element can be configured in the manner of a shaped spring, a flat spring, and/or a leaf spring.

The coupling element can have at least one first contact section associated with the energy store housing structure, at least one second contact section associated with the passenger compartment floor structure, and/or at least one spring section. The at least one first contact section can be used for mechanical connection to the energy store housing structure. The at least one second contact section can be used for mechanical connection to the passenger compartment floor structure. The at least one spring section can be active between the at least one first contact section and the at least one second contact section.

The coupling element can have a predetermined characteristic curve in a displacement/force diagram. The coupling element can have linear-elastic behavior or non-linear-elastic behavior. The characteristic curve of the coupling element can run, at least partially, progressively, linearly, or degressively. The aim is to use the coupling element within an area of the characteristic curve with as little change in stiffness as possible dependent on the displacement. The coupling element can have a stiffness of approximately 2 $kN/mm^2$ to approximately 8 $kN/mm^2$, in particular approximately 5 $kN/mm^2$. The coupling element can have a predetermined vibration behavior. The coupling element can be reversibly elastically deformable below a predetermined level of exerted force in order to effect a reduction in noise. The reduction in noise can be effected by a reduction in vibration, in particular by a reduction in amplitude and/or a change in frequency. The coupling element can serve to damp low-frequency vibrations, in particular vibrations within the range of approximately 10 Hz to approximately 70 Hz, in particular approximately 35 Hz to approximately 40 Hz. The coupling element can be irreversibly plastically deformable above a predetermined level of exerted force in order to enable the compensation of tolerances. The coupling element can serve to increase the stiffness of the body. The coupling element can serve to compensate tolerance-related dimensional deviations of an intermediate space formed between the energy store housing structure and the passenger compartment floor structure. The predetermined level of exerted force above which the coupling element is irreversibly plastically deformable can be a maximum assembly force. The maximum assembly force can be, for example, approximately 2 kN to approximately 8 kN, in particular approximately 5 kN. The coupling element can be designed in terms of geometry and its material with regard to the predetermined level of exerted force. The choice of material can be made taking into account the elastic limit of the material. For example, the choice of material can be made for an elastic limit to the elastic deformability of approximately 400 $N/mm^2$ to approximately 1000 $N/mm^2$, in particular approximately 755 $N/mm^2$, corresponding to a maximum force during operation. For example, the choice of material can be made for an elastic limit to the plastic deformability of approximately 600 $N/mm^2$ to approximately 1400 $N/mm^2$, in particular 1000 $N/mm^2$, corresponding to a maximum assembly force.

The coupling element can be configured so that it is curved with two end sections and a central section. The two end sections can form first contact sections of the coupling element. The central section can form a second contact section of the coupling element. The two end sections can form second contact sections of the coupling element. The central section can form a first contact section of the coupling element.

The coupling element can be configured so that it is annular with two contact sections and two spring sections. The coupling element can be configured so that it is a continuously closed ring. The contact sections can be arranged diametrically opposite each other. The spring sections can be arranged diametrically opposite each other.

The coupling element can be configured so that it is circular. The coupling element can be configured so that it is elliptical with two major vertices and two minor vertices. The coupling element can be elliptical in an unloaded original form. The contact sections can be assigned to the minor vertices and the spring sections to the major vertices. The contact sections can be assigned to the major vertices and the spring sections to the minor vertices. The contact sections can serve to constitute a linear contact and/or a surface contact.

The coupling element can have a configuration other than curved, annular, or circular.

The coupling element can have at least one fastening section. The at least one fastening section can serve to fasten the coupling element to the energy store housing structure and/or to the passenger compartment floor structure. The at least one fastening section can have an opening for receiving a fastening means such as a screw.

The motor vehicle can be a car. The motor vehicle can be a hybrid electric motor vehicle or an electric vehicle. The motor vehicle can have a body. The body can be a self-supporting body or a skeleton body. The stiffness of the body can be increased with the aid of the at least one coupling element. The body can have a passenger compartment. The passenger compartment can have the passenger compartment floor structure. The passenger compartment floor structure can have an underside. In the present case, the underside refers to a side facing the road. The motor vehicle can have the energy store housing structure. The energy store housing structure can serve to receive an energy store. The energy store can be an electrical energy store. The energy store can be a traction battery. The energy store can be a lithium-ion battery. The energy store can be a high-voltage store. The energy store can be a flat store. The energy store housing structure can be arranged on the underside of the passenger compartment floor structure. The energy store housing structure can have a top side. In the present case, a "top side" refers in particular to a side facing away from the road. The energy store housing structure can be closed.

An intermediate space can be formed between the underside of the passenger compartment floor structure and the top side of the energy store housing structure. The intermediate space can have an intermediate space height in the vertical direction of the vehicle. The at least one coupling element can serve to compensate tolerance-related dimensional deviations in the intermediate space height. The dimensional deviation to be compensated in the vertical direction of the vehicle can be, for example, approximately 0 mm to approximately +/−20 mm, in particular approximately +/−5 mm. The intermediate space can have an intermediate space length in the longitudinal direction of the vehicle. The intermediate space can have an intermediate space width in the transverse direction of the vehicle. The at least one coupling element can serve to compensate tolerance-related dimensional deviations in the longitudinal direction of the vehicle and/or in the transverse direction of the vehicle. The dimensional deviation to be compensated in the longitudinal direction of the vehicle and/or in the transverse direction of the vehicle can be, for example, approximately 0 mm to approximately +/−20 mm, in particular approximately +/−9 mm.

The at least one coupling element can be arranged in the intermediate space. A single coupling element or a plurality of coupling elements can be arranged between the energy store housing structure and the passenger compartment floor structure. A single coupling element can be arranged at least approximately centrally in the longitudinal direction of the intermediate space and/or in the transverse direction of the intermediate space. In this respect, the coupling element can serve as a central mounting point. A plurality of coupling elements can be arranged in such a way that vibration behavior is optimized.

The at least one coupling element can be fastened to the energy store housing structure or to the passenger compartment floor structure. The at least one coupling element can be screwed to the energy store housing structure or to the passenger compartment floor structure. The at least one coupling element can be fastened to the energy store housing structure or to the passenger compartment floor structure in such a way that tightness, in particular water tightness, of the passenger compartment and/or tightness, in particular gas tightness, of the energy store housing structure is ensured.

In summary and in other words, the invention results, inter alia, in a vibration-optimized high-voltage store central mounting by means of spring sheet. According to the invention, by virtue of the concept of a spring sheet, by means of a closed "sheet steel ring" reversible deformation in the elastic range can be used to reduce vibration amplitudes and/or optimize wavelengths. A defined gap can be set and thus a tolerance compensated via plastic deformation of the "sheet steel ring" during assembly of two components to be coupled. Dynamic vibration behavior and quasi-static assembly forces can be set by the geometry, wall thickness, and material quality of the "sheet steel ring". Using the concept of a spring sheet, elastic deformation can be used for vibration optimization of a body floor plate in electric vehicles with a high-voltage flat store and hence, for example, for noise reduction by the element being installed between the body and the high-voltage store. At the same time, as a result, an assembly force of the high-voltage store during installation on the body can be limited in a defined fashion and the compensation of tolerances in the vertical direction of the vehicle enabled.

Functional synergies are created by the invention. Effort, such as in terms of assembly, maintenance, and retention and/or costs, are reduced. Qualities that are valued by customers are optimized, in particular in terms of the interior acoustics. The noise level in the passenger compartment is reduced. An overall system is acoustically advantageously detuned. A high degree of stiffness during operation is achieved with a simultaneously limited assembly force. The compensation of tolerances in the vertical direction of the vehicle between the body and the high-voltage store of, for example +/−5 mm is moreover enabled.

Exemplary embodiments of the invention are described in detail with reference to the Figures.

DETAILED DESCRIPTION OF THE DRAWINGS

Figure 1:
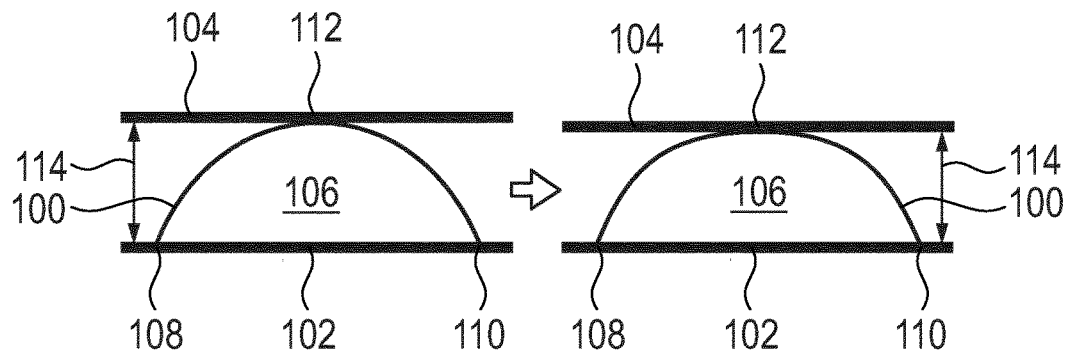
FIG. 1 shows schematically a curved coupling element with a maximum gap and a minimum gap.

FIG. 1 shows a coupling element 100 which is produced from a sheet (plate) of spring steel and has a curved shape. The coupling element 100 is arranged in an intermediate space 106 formed between an energy store housing structure 102 and the passenger compartment floor structure 104, and has two end sections 108, 110 and a central section 112. The coupling element 100 is supported under pretension with the end sections 102, 104 on the energy store housing structure 102 and with the central section 106 on the passenger compartment floor structure 104. The coupling element has a relatively high degree of stiffness of approximately 5 kN/mm$^2$ and thus effects a reduction in low-frequency vibrations below a predetermined level of exerted force by reversible elastic deformation.

The coupling element 100 is moreover irreversibly plastically deformable above a predetermined level of exerted force and thus enables tolerance-related dimensional deviations of the intermediate space height 114 to be compensated. An intermediate space height 114 at an upper tolerance limit is referred to as the maximum gap and is shown on the left-hand side in FIG. 1. An intermediate space height 114 at a lower tolerance limit is referred to as the minimum gap and is shown on the right-hand side in FIG. 1.

Figure 2:
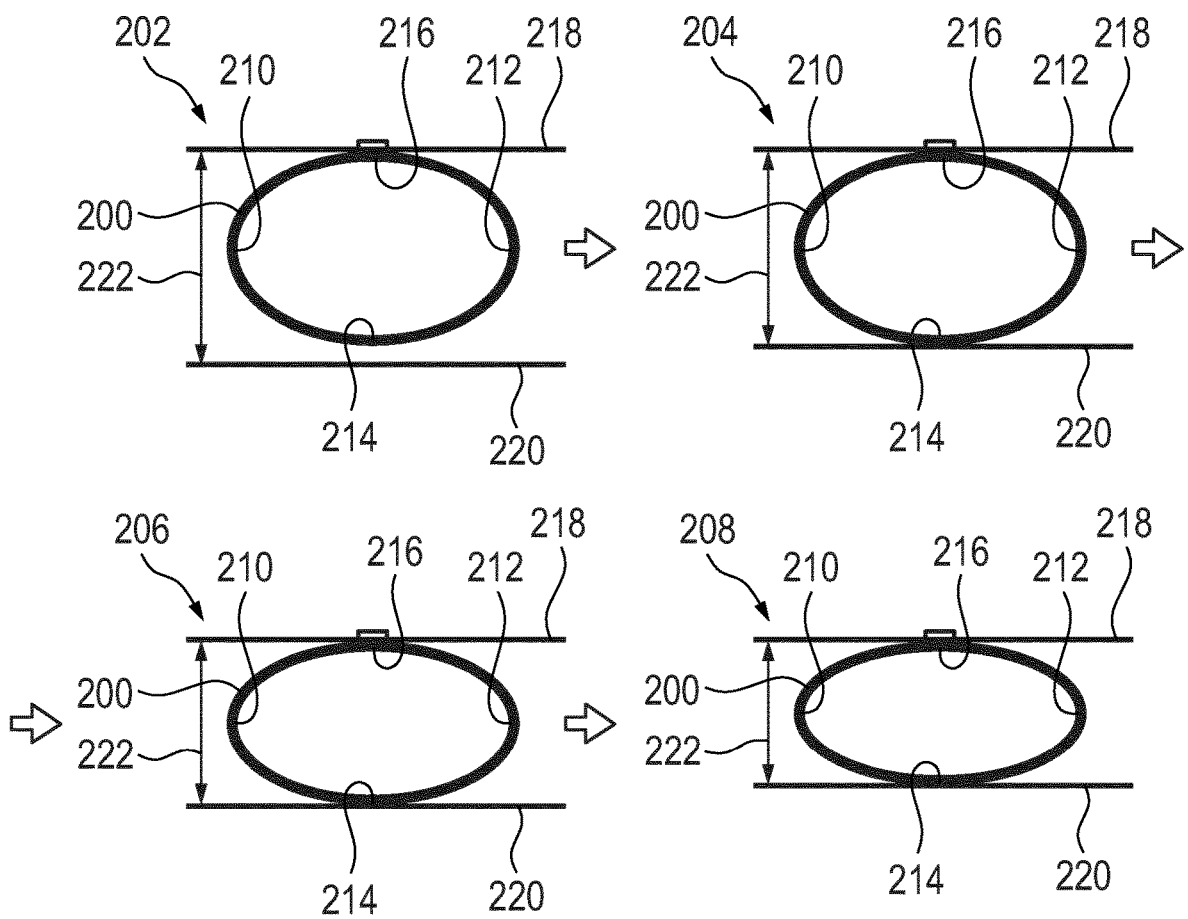
FIG. 2 shows schematically an annular coupling element in an original position, with a maximum gap, in a construction position, and with a minimum gap.

FIG. 2 shows an annular coupling element 200 in an unloaded original position 202, with a maximum gap 204, in a construction position 206, and with a minimum gap 208. The construction position 206 corresponds to an intermediate space target height, the maximum gap 204 results at the upper tolerance limit, and the minimum gap 208 results at the lower tolerance limit.

The coupling element 200 is configured as elliptical with two major vertices 210, 212 and two minor vertices 214, 216 and fastened to the passenger compartment floor structure 218. The coupling element 200 is supported, in an installed or operating position in which the maximum gap 204, a construction position 206, a minimum gap 208, or an intermediate position, can exist, pretensioned with the minor vertex 214 on the energy store housing structure 220 and with the minor vertex 216 on the passenger compartment floor structure 218. In the event of vibrations of the energy store housing structure 220 and/or the passenger compartment floor structure 218, the major vertex 210, 212 can deviate laterally. In order to compensate tolerance-related dimensional deviations of the intermediate space height 222, the coupling element 200 is plastically deformable above a predetermined level of exerted force. Otherwise, reference is additionally made to FIG. 1 and the associated description.

Figure 3:
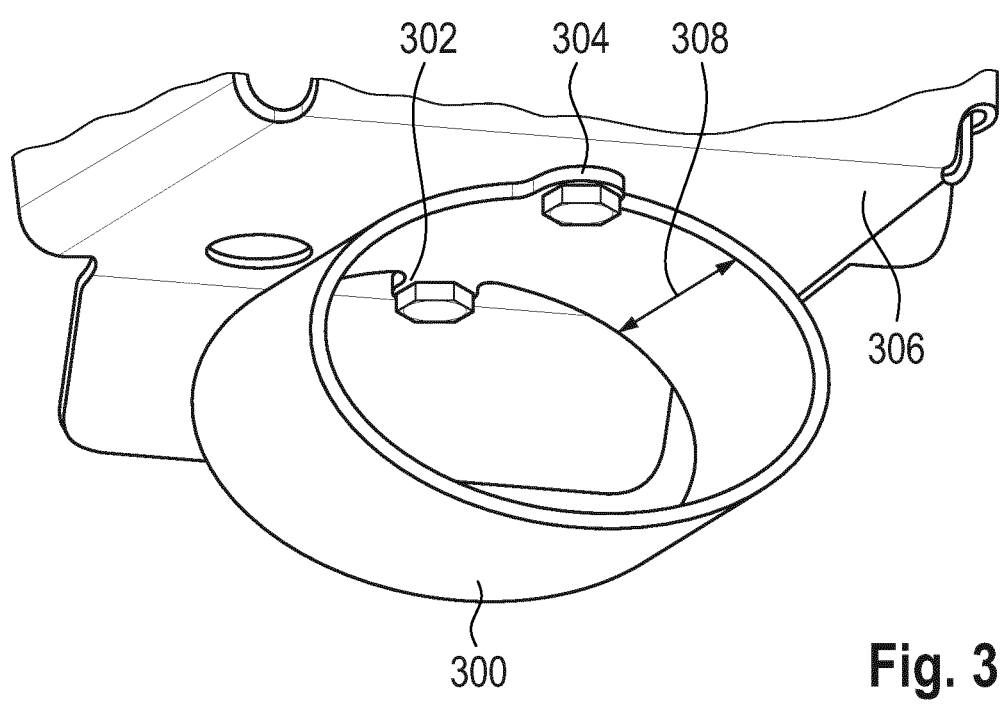
FIG. 3 shows an annular coupling element with fastening interfaces on a passenger compartment floor structure.

FIG. 3 shows an annular coupling element 300 with fastening sections 302, 304 to a passenger compartment floor structure 306. The coupling element 300 is produced from a sheet of spring steel, is configured as elliptical, and has a width 308. The coupling element 300 is active between the passenger compartment floor structure 306 and an energy store housing structure (not illustrated here). Otherwise, reference is additionally made to FIG. 1 and FIG. 2 and the associated description.

"Can" refers in particular to optional features of the invention. There are therefore also developments and/or exemplary embodiments of the invention which additionally or alternatively have the respective feature or the respective features.

Isolated features can also as required be singled out from the combinations of features disclosed in the present document and, by breaking a structural and/or functional link which may exist between the features, be used in combination with other features to define the subject of the claims.

REFERENCE SIGNS 100 coupling element
102 energy store housing structure
104 passenger compartment floor structure
106 intermediate space
108 end section
110 end section
112 central section
114 intermediate space height
200 coupling element
202 original position
204 maximum gap
206 construction position
208 minimum gap
210 major vertex
212 major vertex
214 minor vertex
216 minor vertex
218 passenger compartment floor structure
220 energy store housing structure
222 intermediate space height
300 coupling element
302 fastening section
304 fastening section
306 passenger compartment floor structure
308 width of the coupling element

The invention claimed is:

1. A motor vehicle, comprising:
an energy store housing structure;
a passenger compartment floor structure; and
at least one resilient spring sheet annular coupling element, wherein
the at least one resilient spring sheet annular coupling element is of a metal or metal alloy, and is configured with two contact sections and two spring sections, an opening extending through the annular coupling element,
the resilient spring sheet annular coupling element is arranged between the energy store housing structure and the passenger compartment floor structure of the motor vehicle so as to make respective contact via the two contact sections with the opening extending laterally between the energy store housing structure and the passenger compartment floor structure, and is active between the energy store housing structure and the passenger compartment floor structure.

2. The motor vehicle according to claim 1, wherein the coupling element is fastened to the energy store housing structure or to the passenger compartment floor structure.

3. The motor vehicle according to claim 1, wherein the coupling element is reversibly elastically deformable below a predetermined level of exerted force in order to enable a reduction in noise, and is irreversibly plastically deformable above a predetermined level of exerted force in order to enable compensation of tolerances.

4. The motor vehicle according to claim 1, wherein the coupling element is configured so as to be elliptical with two major vertices and two minor vertices.

5. The motor vehicle according to claim 4, wherein the two contact sections are assigned to the minor vertices and the two spring sections are assigned to the major vertices.

6. The motor vehicle according to claim 1, wherein the coupling element has at least one fastening section.

* * * * *